J. E. WARD.
PIPE COUPLING.
APPLICATION FILED NOV. 10, 1911.

1,099,220.

Patented June 9, 1914.

Witnesses:
Edwin A. Packard
H. Wächter

Inventor
John E. Ward
By his Attorneys
Kiddle & Wendell

UNITED STATES PATENT OFFICE.

JOHN E. WARD, OF NEW YORK, N. Y., ASSIGNOR TO STANDARD HEAT AND VENTILATION COMPANY, A CORPORATION OF NEW YORK.

PIPE-COUPLING.

1,099,220.  Specification of Letters Patent.  Patented June 9, 1914.

Application filed November 10, 1911. Serial No. 659,508.

*To all whom it may concern:*

Be it known that I, JOHN E. WARD, a citizen of the United States, and a resident of the borough of Manhattan of the city of New York, in the county and State of New York, have invented certain new and useful Improvements in Pipe-Couplings, of which the following is a specification.

The invention relates to improvements in pipe couplings and particularly to couplings adapted for use in steam heating systems for railway cars. The pipe couplings to which this invention is particularly directed are preferably utilized with flexible rubber pipes to which they are connected. Each of the pipe couplings comprises a coupling head or body portion and a nipple portion which engages the end of the flexible pipe. The body and nipple portions have a ball and socket connection between them to permit the body portion of the coupling to move relative to the nipple portion without causing an undue bending or kinking of the flexible pipe.

As showing a specific embodiment of the invention reference is made to the drawings forming a part of the specification in which—

Figure 1:
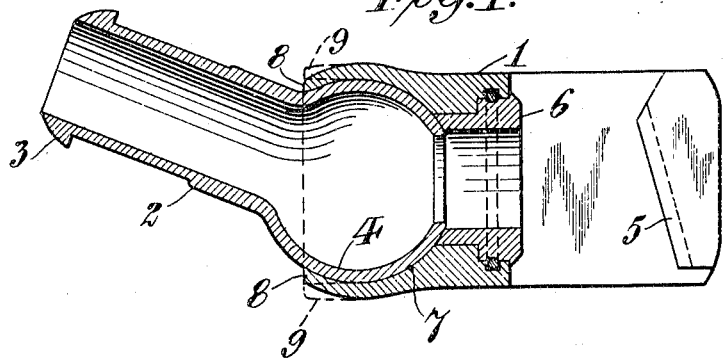
Figure 2:
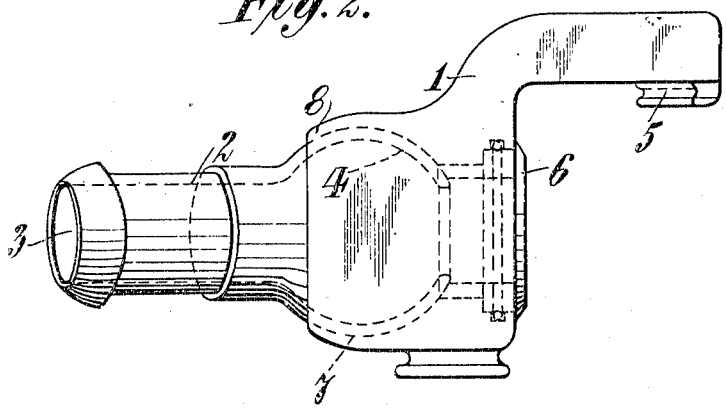
Figure 3:
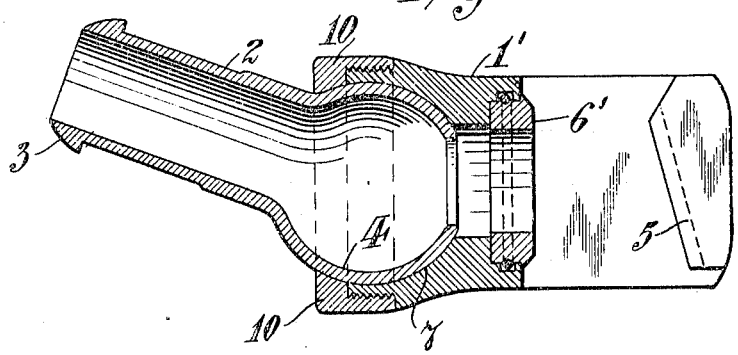

Figure 1 is a vertical longitudinal sectional view of the pipe coupling shown in Fig. 2. Fig. 2 is a plan view of that form of pipe coupling which is shown in section in Fig. 1. Fig. 3 illustrates a different manner of holding the nipple portion or member in place in the body member from that illustrated in Figs. 1 and 2.

In the construction shown in Figs. 1 and 2 the body or coupling head is designated by the reference character 1 and the nipple portion by the reference character 2. The nipple portion 2 comprises at one end a part 3 which is particularly designed and adapted to be connected to the end of a flexible rubber pipe of a steam heating system for railway cars and at the other end the spherical ball portion 4 constituting a part of a flexible universal connection between the body and nipple. The body portion comprises the wedge portion 5 and the seat or washer 6 each of which coöperate with the proper members of a companion coupling head when in use. The body portion 1 also is provided with a hollow spherical portion 7 in which the spherical ball portion 4 of the nipple is seated and securely held. The seat 6 extends a sufficient length and is shaped to tightly fit with the spherical portion 4 of the nipple whereby when the coupling head is wedged in operative position with a companion coupling head a tight joint may be formed between said seat 6 and the nipple 2. The body 1 is preferably formed of some metal that is capable of being wrought whereby the holding lips 8 can be bent from the dotted position 9 to the position shown in full lines and thus retain the spherical portion of the nipple in the socket of the body portion.

In the form shown in Fig. 3 it will be observed that there is comprised the body portion 1' and the nipple portion 2, the former of which is provided with a semi-spherical seat to receive the spherical portion on the latter. These parts are tightly held in place by means of the nut 10 on the body portion. It will be observed that in this form the seat or washer 6' does not extend to and engage the ball end of the nipple, but manifestly the seat could be extended as in Figs. 1 and 2 to engage the ball portion of the nipple. It will furthermore be noted that the body shown in Fig. 3 need not be of a material capable of being wrought as the ball end of the nipple can be retained in place by the nut 10. The construction shown in Figs. 1 and 2 can readily be modified so as to employ the nut 10 shown in Fig. 3 as a means for retaining the nipple in place in the body member if desired.

It will be apparent in each of the forms above described that the ball and socket connection between the nipple portion and the body portion of the coupling constitutes a flexible universal connection between said portions.

It is obvious that various forms and modifications may be made without departing from the spirit and scope of the invention.

I claim as my invention:

A pipe coupling comprising body portions each having therein a nipple portion and a washer which coöperatively engages the nipple portion, the nipple portions each having a spherical end that is seated in its proper body portion, the washer in each of the body portions extending to, fitting and pressing against the spherical ends of its coöperating nipple portion when the washers are pressed against each other at the time when the body members are in coupled position.

This specification signed and witnessed this 6th day of November A. D. 1911.

JOHN E. WARD.

Signed in the presence of—
G. McGrann,
Edwin A. Packard.